W. P. BROWN.
Cultivator Tongues.
No. 199,025.  Patented Jan. 8, 1878.
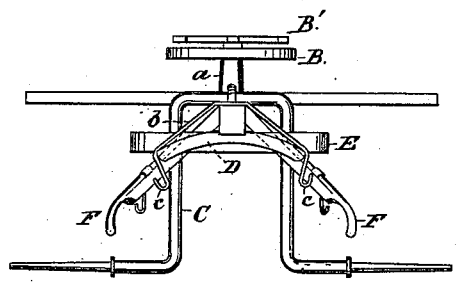
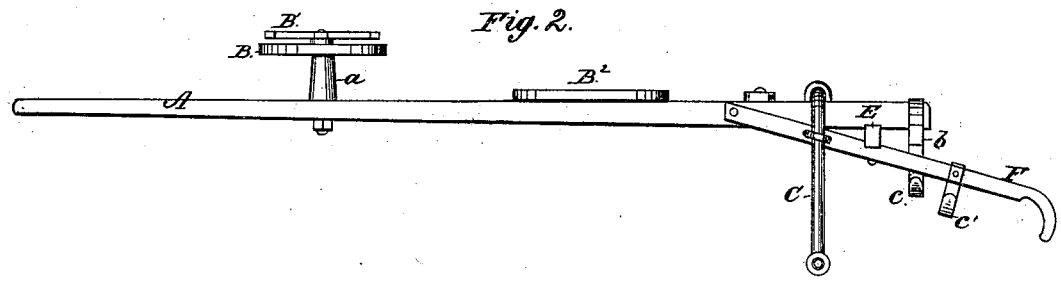
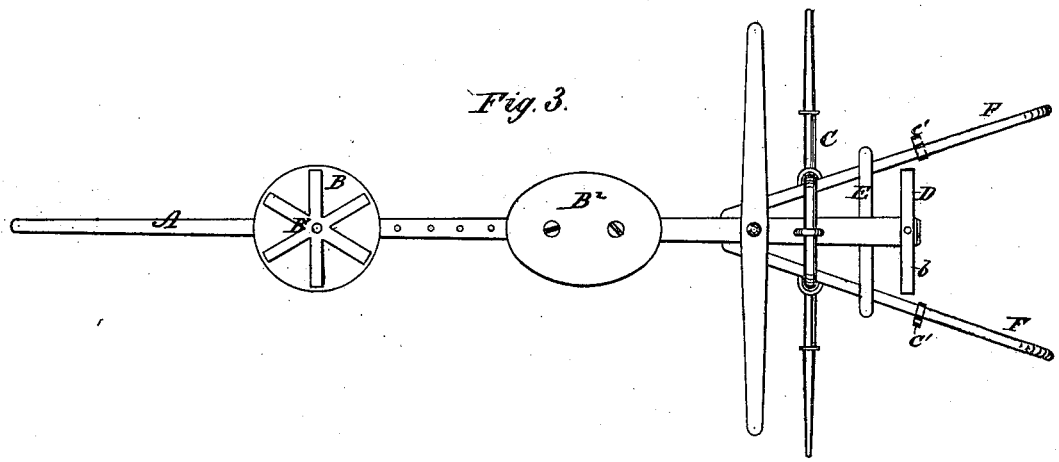

UNITED STATES PATENT OFFICE.

WILLIAM P. BROWN, OF ZANESVILLE, OHIO.

IMPROVEMENT IN CULTIVATOR-TONGUES.

Specification forming part of Letters Patent No. 199,025, dated January 8, 1878; application filed April 23, 1877.

*To all whom it may concern:*

Be it known that I, WILLIAM P. BROWN, of Zanesville, in the county of Muskingum and State of Ohio, have invented a new and Improved Cultivator-Tongue; and I do hereby declare that the following is a full, clear, and exact description of the same, reference being had to the accompanying drawings, forming part of this specification, in which—

Figure 1 is a rear view; Fig. 2, a side view, and Fig. 3 a plan view.

My invention relates to an improved form of cultivator-tongue, designed more particularly for that class of cultivators which are duplicated in form, requiring a double team, and employing gangs or plows upon opposite sides of the row of plants, which gangs are attached to and drawn by the lower bent portions of a crank-axle, which latter is supported upon wheels. In this class of cultivators two styles of tongues are used, one being what is known as the "split" or "double" tongue, composed of two bars converging toward and united at their front ends, and the other being the single tongue. The advantage claimed for the double tongue is that it keeps the team from walking on the plants, while the objection urged against it is the cramping and obstruction of the team in turning at the end of the row, as the wide parts of the double tongue strike the thighs of the team, and, by binding against their hind legs, prevent them from turning freely. In the double tongue, also, the team, if unruly, are liable to get their legs in the fork or between the bars of the double tongue. The advantage claimed for the single tongue is that it allows the team to turn freely at the ends of the row; but the objection to it is that it permits the team to step upon the corn or plants between them.

The object of my invention is to secure the advantages of both forms of tongue without the objection of either; to which end my improvement consists, chiefly, in combining with the tongue a wheel, disk, reel, board, or other separating device, which is made to extend rigidly across the tongue, so as not to be changed from a horizontal position.

The invention also consists in the construction and arrangement of the support at the rear end of the tongue, for the gangs or plows to be hung upon, as hereinafter more fully described.

In the drawing, A represents the tongue of a double cultivator which is provided with my separating devices. These devices may consist of a wheel, B, a reel, B$^1$, a board or disk, B$^2$, or any other device located upon the tongue and extending rigidly across the same, so as not to be turned from a horizontal plane, to effect the separation of the team, and still allow their hind parts to be free in turning. In most cases, however, I shall prefer to use a wheel, B, of from fourteen to eighteen inches in diameter, made simply of inch board, and located upon a standard, $a$, from five to six inches in height, firmly attached to the tongue, the wheel being secured thereto in any suitable manner that will permit it to turn freely upon its center, and prevent abrasion or wear to the skin of the team as the latter rub from time to time against it, which motion is nearly continuous from one side or the other.

The separating devices, as thus described, are adjustably attached to the tongue, so as to permit the location of the same to be changed to suit the habits of the team.

As to the advantages of the wheel over the double tongue for this purpose, it more perfectly separates the team by reason of its greater width than the double tongue at the same point of location, and it also separates the team in the front as well as the rear, while the double tongue does not, as it converges to a point at its front end. It strikes the team much higher up, allowing the free use of their limbs, while the double tongue, being low, strikes the thighs or legs of the team in turning. The wheel also further obviates the necessity and expense of a double tongue, and prevents the possible danger resulting from an entanglement of the horses' legs in the fork of the double tongue, and it also prevents the horses from tramping upon each others feet in turning.

Another advantage claimed is that when one of the plows or gangs upon either side of the row runs deeper than the other, or has an unequal draft, the tongue necessarily pulls to one side. The wheel, being located between the team and in contact with their bodies, steadies the tongue against such movement, the wheel being at a point where the tongue springs less than at the neck-yoke, and where the leverage is better in holding the same steady.

In constructing double cultivators heretofore of the class to which my invention belongs, I have employed a double crank-axle, C, which was arranged with a double tongue, in which the rear diverging ends of the double tongue formed the frame-work of the cultivator, and upon which rear extension supporting-hooks were placed, upon which the gangs or plows were hung or suspended when not in use.

In using a single tongue, however, with this general construction of double cultivator having double crank-axle, I have been obliged to modify the frame-work of the cultivator by extending the rear of the tongue past the crank-axle and attaching to its end the curved cross-bar D, upon which is arranged the metallic strap $b$, which terminates at its pendent ends in hooks $c\ c$, upon which hooks the gangs or plows may be suspended. When, however, the timber may not be of sufficient length to permit the rear extension of the tongue, a cross-bar, E, with handles F, may be used, the handles in this case being made like plow-handles, and provided with the hooks $c'\ c'$, which handles and cross-bar take the place of the cross-bar D, strap $b$, and hooks $c$.

The handles F are made like plow-handles, so as to permit the plowman to lift when desired, and, instead of being attached to the cross-bar E, the crank-axle, and the tongue in front, they may extend no farther forward than the crank-axle, and be there directly fastened to the same.

In relation to the separating devices for the tongue, I would state that while the same have been described as being specially adapted to the single tongue, they are also applicable to and may be used in connection with the double tongue, especially when cultivators are already provided with them, and when said tongues are made narrow. I therefore may use my separating devices in connection with any form of tongue attached to any form of cultivator.

Having thus described my invention, what I claim as new is—

1. An adjustable device located upon a cultivator-tongue, and extending rigidly across the same, so as to separate the team without being turned from a horizontal plane, substantially as described.

2. A separating wheel or disk, combined with the tongue of a cultivator, and arranged to rotate substantially as and for the purpose set forth.

3. The separating-wheel B, arranged to rotate, and mounted upon a standard fixed to the tongue of the cultivator, as and for the purpose described.

4. The handles F, having hooks $c'$, in combination with the cultivator-tongue, the bar E, and crank-shaft C, substantially as and for the purpose described.

WILLIAM P. BROWN.

Witnesses:
   F. S. GATES,
   HORATIO W. CHANDLEE.